(12) United States Patent
Bull

(10) Patent No.: US 7,337,043 B2
(45) Date of Patent: Feb. 26, 2008

(54) TERRAIN MANEUVER ADVISORY ENVELOPE SYSTEM AND METHOD

(75) Inventor: Ian J. Bull, Lake Forest Park, WA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 763 days.

(21) Appl. No.: 10/880,870

(22) Filed: Jun. 30, 2004

(65) Prior Publication Data

US 2006/0004497 A1    Jan. 5, 2006

(51) Int. Cl.
*G01C 23/00* (2006.01)
*G05D 1/00* (2006.01)
*G08G 5/04* (2006.01)

(52) U.S. Cl. ............... 701/1; 701/3; 342/29; 340/961; 340/963

(58) Field of Classification Search ........... 701/1, 701/3, 14, 211, 300–302; 342/29, 41; 340/961, 340/963, 971, 980
See application file for complete search history.

(56) References Cited

U.S. PATENT DOCUMENTS

| | | | |
|---|---|---|---|
| 5,313,201 A * | 5/1994 | Ryan | .................. 340/961 |
| 6,421,603 B1 | 7/2002 | Pratt et al. | |
| 6,452,511 B1 | 9/2002 | Kelly et al. | |
| 6,525,674 B1 | 2/2003 | Kelly et al. | |
| 6,567,728 B1 | 5/2003 | Kelly et al. | |
| 6,583,733 B2 | 6/2003 | Ishihara et al. | |
| 6,653,947 B2 | 11/2003 | Dwyer et al. | |
| 6,678,588 B2 | 1/2004 | He | |
| 6,720,891 B2 | 4/2004 | Chen et al. | |
| 7,064,680 B2 * | 6/2006 | Reynolds et al. | ........... 340/961 |
| 2004/0059473 A1 * | 3/2004 | He | .................. 701/4 |
| 2006/0077092 A1 * | 4/2006 | Gilliland et al. | .......... 342/26 B |
| 2006/0220920 A1 * | 10/2006 | McCauley et al. | .......... 340/963 |

* cited by examiner

Primary Examiner—Yonel Beaulieu
(74) Attorney, Agent, or Firm—Nathan O. Jensen; Kyle Eppele

(57) ABSTRACT

A terrain advisory system for an aircraft is disclosed. The terrain advisory system includes a processing unit, a display unit coupled to the processing unit where the display unit displays a map, and a database coupled to the processing unit. The system also includes a sensor system coupled to the processing unit and a terrain awareness and warning system (TAWS) coupled to the processing unit. The TAWS generates cautions and alerts. The processing unit includes a program that generates a terrain advisory envelope extending beyond the distance and lateral envelope within which the TAWS provides cautions and alerts. The terrain advisory envelope is distinguished from TAWS cautions and alerts with a graphical appearance that differs from the graphical appearance of TAWS cautions and alerts.

22 Claims, 2 Drawing Sheets

TERRAIN MANEUVER ADVISORY ENVELOPE SYSTEM AND METHOD

BACKGROUND

One of the dangers inherent in flying aircraft, is the possibility of encountering obstacles, such as, but not limited to, terrain obstacles. In fact, controlled flight into terrain (CFIT) is one of the more significant causes of aircraft accidents today. The aircraft industry has taken steps to alleviate the problem, such as improving and enhancing the presentation of terrain information to a flight crew to ensure that they are alerted to conditions that would lead to CFIT.

Much of the work by the aircraft industry has been focused on providing alerts to the pilot of approaching terrain. Such information may be in the form of advisories, alerts (aural and visual), and map presentations. Even with such information, the flight crew is not conventionally provided with information to help them decide which path or heading to take to avoid the terrain once a terrain warning or caution has occurred. With conventional systems, most certified systems assume that the pilot will climb at full power and max angle of attack to avoid terrain. However, it is acknowledged that this may not always result in the shortest path to clear space or to avoid any hazards. Often a slight turn to the left or right in conjunction with a climb ends up in achieving terrain clearance more quickly.

With conventional systems there are no agreed methods to provide lateral guidance for post alert terrain avoidance maneuvers. The reason that such guidance is not provided is that this may present certain risks and certification risks should the pilots follow incorrect guidance provided by the system. For currently certified terrain awareness and warning systems (TAWS), when an alert occurs, TAWS provides an indication of either (1) only terrain that is directly in the path of the aircraft, or (2) all terrain around the aircraft that is above the aircraft altitude. No distinction is conventionally made between current threat and possible near future terrain threats.

Accordingly, there is a need for a terrain maneuver advisory system and method in which indication of terrain that is directly in front of the aircraft is provided to the pilot. Further, there is a need for system and method that provides an indication of the terrain in front of the aircraft along with better situational awareness of the terrain around the aircraft. Further still, there is a need for a maneuver advisory envelope to be provided on a map display for a pilot to determine a reasonable maneuver for the aircraft.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

What is provided is a terrain advisory system for an aircraft. The terrain advisory system comprises a processing unit and a display unit. The display unit displays a map. The terrain advisory system also comprises a database coupled to the processing unit and a sensor system coupled to the processing unit. Further, the terrain advisory system comprises a terrain awareness and warning system (TAWS) coupled to the processing unit. The TAWS generates cautions and alerts. The processing unit comprises a program that generates a terrain advisory envelope extending beyond the distance and lateral envelope within which the TAWS provides cautions and alerts. The terrain advisory envelope is distinguished from TAWS cautions and alerts with a graphical appearance that differs from the graphical appearance of TAWS cautions and alerts.

What is also provided is a method for presenting information to a flight crew member of an aircraft. The method comprises providing a display unit on board the aircraft. The method also comprises generating a caution by a TAWS system. Further, the method comprises displaying a map on the display. Further, the method comprises displaying a caution region on the map and displaying a lateral boundary for the caution region. Further still, the method comprises generating a maneuver advisory region on the map. The maneuver advisory region is depicted with a different graphical representation then the caution region and the maneuver advisory region extends outside of the lateral boundaries.

Further, what is provided is an apparatus for providing information to a flight crew member of an aircraft. The apparatus comprises a means for displaying information to a flight crew member on board an aircraft. The apparatus also comprises a means for displaying information to a flight crew member on board an aircraft. Further, the apparatus comprises a means for generating a caution by a TAWS system. Further still, the apparatus comprises a means for generating a map on the display means. The generating is caused by the generation of a caution. Yet further still, the apparatus comprises a means for displaying a caution region on a map and a means for displaying a lateral boundary for the caution region. Yet further still, the apparatus comprises a means for generating a maneuver advisory region on the map. The maneuver advisory region is depicted with a different graphical representation than the caution region and maneuver advisory region extends outside of the lateral boundary.

Alternative examples and other exemplary embodiments may also be provided which relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF PREFERRED AND EXEMPLARY EMBODIMENTS

Figure 1:
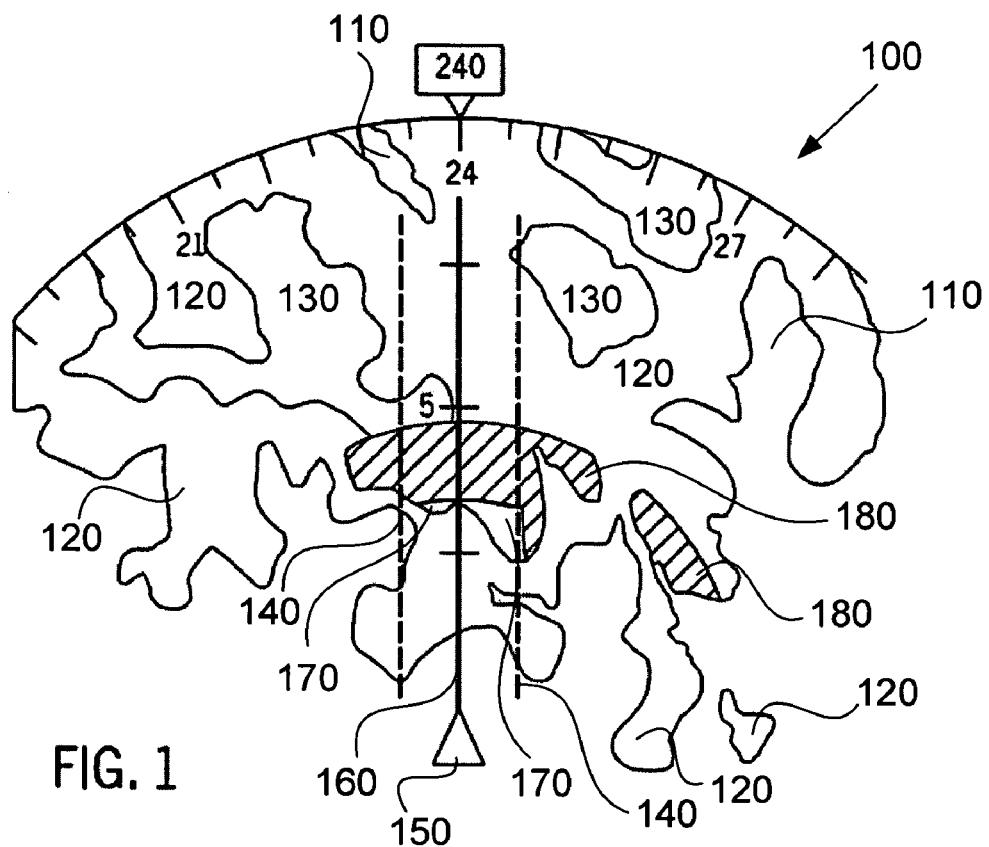
FIG. 1 is an exemplary depiction of a maneuver advisory envelope with a terrain caution indication.

Before describing in detail the particular improved system and method, it should be observed that the invention includes, but is not limited to a novel structural combination of conventional data/signal processing components and communication circuits, and not in the particular detailed configurations thereof. Accordingly, the structure, methods, functions, control, and arrangement of conventional components and circuits have, for the most part, been illustrated in the drawings by readily understandable block representations and schematic diagrams, in order not to obscure the disclosure or structural details which will be readily apparent to those skilled in the art, having the benefit of the description herein. Further, the invention is not limited to the particular embodiments depicted in the exemplary diagrams, but should be construed in accordance with the language in the claims.

While TAWS systems in general are conventionally used and known, they do have certain shortcomings. For example, TAWS systems in general are reactive systems that do not necessarily provide an indication of maneuvers for the aircraft. What is assumed by the TAWS system is that the pilot will climb quickly to avoid whatever hazard might be along its present heading. However, it may be more efficient, for a pilot to make a lateral maneuver as opposed to a vertical maneuver to avoid certain terrain hazards.

A particular solution to the problem of terrain avoidance maneuvers, once an alert has occurred, is to provide an indication of the terrain that is directly in front of the aircraft, coupled with better situational awareness of the terrain around the aircraft. Terrain in front of the aircraft is the first thing the flight crew needs to be aware of and therefore is displayed in yellow or red (as per industry standards) to focus the attention of the flight crew. The second informational need for the flight crew is a display of a maneuver advisory envelope on the map. This maneuver advisory envelope highlights all of the terrain around the aircraft in a 360 degree arc that is within a reasonable maneuver distance of the aircraft. Highlighting this terrain gives the pilot an immediate awareness of other terrain that could trigger further alerts as the aircraft starts to maneuver. This information may be presented in such a way as to not distract the pilots from showing the terrain that is actually causing the alert.

Given the maneuver advisory envelope indication, the pilot can quickly determine which direction has the most hazardous terrain and ensure that, should a turn be initiated, that it is away from this terrain. For example, referring now to FIG. 1, an exemplary portion of a maneuver advisory envelope display 100 is depicted. Display 100 is conventionally a clear display showing a dark background color such as regions 110, a second color, such as green in regions 120. Regions 120 may be a relatively low lying region. A second color, such as tan or brown may provide an indication of levels which are at or above the height of the aircraft, depicted as regions 130. In the exemplary embodiment depicted, a lateral TAWS boundary is depicted by lines 140 for aircraft 150 moving on a heading 160. According to the exemplary embodiment depicted, the TAWS system provides a TAWS caution in region 170 which is within the lateral TAWS boundary of aircraft 150. However, what is not commonly provided by TAWS systems are caution or advisory information of areas outside of this heading region. Accordingly, it is beneficial for the system to be enhanced to provide a maneuver advisory envelope 180 that indicates that there is additional terrain ahead and to the right of the aircraft, that may become a threat to the aircraft when it maneuvers.

For example, the pilot may wish to maneuver to the right and without the additional maneuver advisory envelope indication, may not be alerted to the fact that there is additional terrain hazards to the right of the aircraft until the pilot actually turns the aircraft at which point the TAWS caution would be shown. The size of the maneuver advisory envelope may be based on a fixed distance from the aircraft, or could be based on estimated travel time to the outer perimeter of the maneuver advisory envelope, or may be based on other factors. In the exemplary embodiment depicted, region 170 which is the TAWS caution region may be colored yellow which coincides with industry standards for caution indications. Although it may be industry standard to color region 170 yellow, other colors may be used without departing from the scope of the invention. Further, all the colors and/or fill patterns are not confined to the embodiment shown. Any of a variety of colors and/or fill patterns may be used without departing from the scope of the claims.

Figure 3:
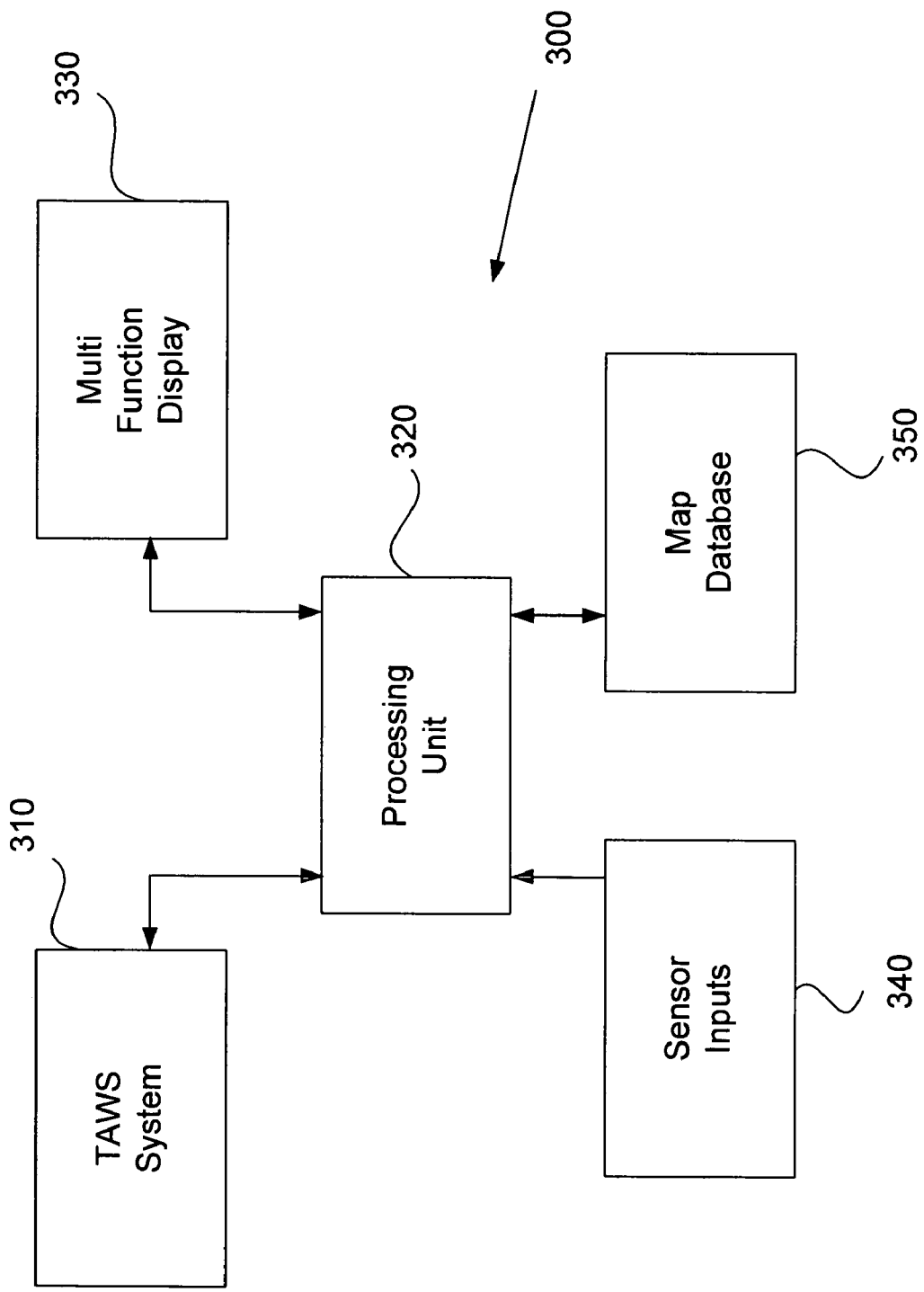
FIG. 3 is an exemplary block diagram of a system providing the maneuver advisory envelope as disclosed.

Referring now to FIG. 3, a system 300 for providing a terrain maneuver advisory envelope, as described, is depicted. The exemplary block diagram 300 comprises a TAWS system 310 which communicates with a processing unit 320. TAWS system 310 is a well known system in the aircraft industry for providing terrain advisory and warnings. Conventionally TAWS systems provide advisories and warnings when an aircraft may be in danger of collisions with terrain. Processing unit 320 is coupled to a multi function display (MFD) 330. Multi function display 330 has the ability to provide a map, such as the maps depicted in FIG. 1 and/or may provide advisories and/or alerts to the pilot or flight crew. Multi function display 330 may also be used to display other information to the pilot and/or flight crew. In a particular embodiment, when a caution becomes active, such as in FIG. 1, the terrain map 100 may automatically be displayed on multi function display 330 in order to alert the pilot that there is a terrain threat that must be dealt with in short order. Processing unit 320 also receives a plurality of sensor input 340. Sensor inputs 340 may include, but are not limited to air data, global positioning system (GPS) data, radar data, and other sensor data which may be available. Processing unit 350 also communicates with a map database which may be used to generate the map displays on multi function display 330. Information from sensor 340, map database 350, and TAWS system 310 are coordinated by processing unit 320 to generate the terrain maneuver advisory envelopes and the map displayed on multi function display 330.

Figure 2:
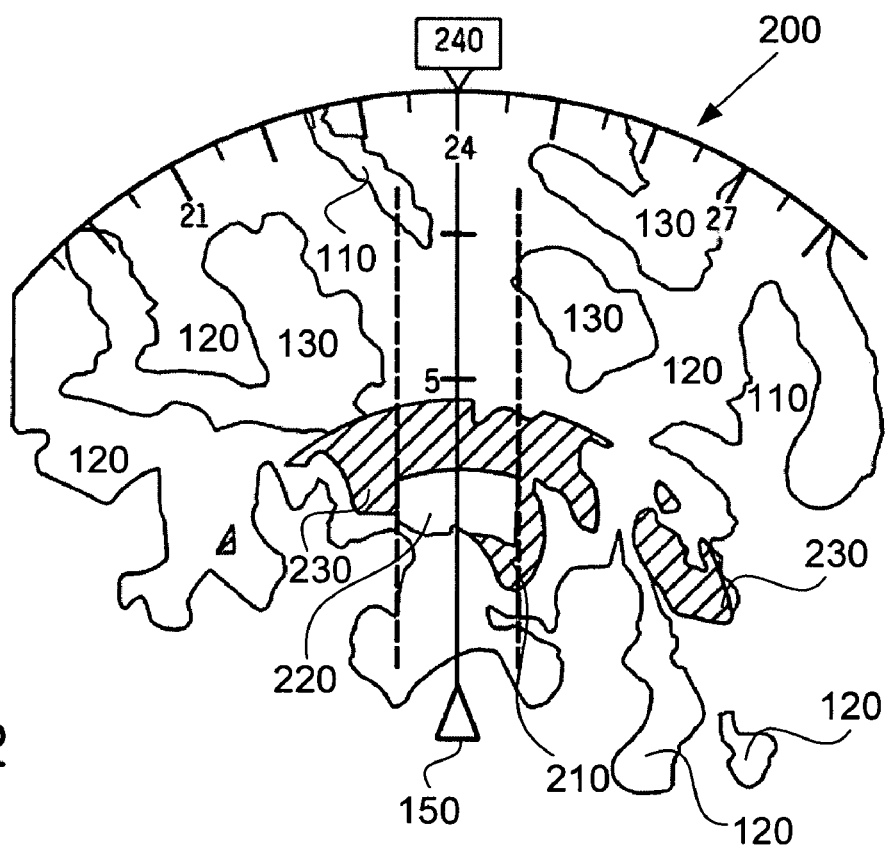
FIG. 2 is an exemplary depiction of a maneuver advisory envelope with a terrain warning indication.

Referring now to FIG. 2 a map 200 is depicted. Map 200 is similar to map 100 of FIG. 1 but the aircraft 150 has preceded further toward the terrain threat. Now the TAWS system has indicated that there is a TAWS warning 210 that is active. TAWS warning 210 may be indicated by a red zone on map display 200 according to industry standards. The red color is used to alert the pilot or flight crew that the warning requires immediate action and a serious terrain threat exists. Caution region 220, typically shown in yellow is also active. As discussed above the terrain maneuver advisory envelope 230 has been slightly enlarged as aircraft 150 has progressed towards the terrain threat. It should be clear to the pilot at this point that there is more terrain to the right which may be a threat to the aircraft, than to the left. Accordingly, if the pilot makes a decision to avoid terrain by turning, a turn to the left would be the best course of action to take. The size of the maneuver advisory envelope is calculated by the processing unit 320 based upon a nominal turn radius for the aircraft assuming a max (or near maximum climb). Alternatively, the outer boundary of the maneuver advisory envelope may be generated based on a predetermined distance from the aircraft, or may be generated based on the aircraft's speed, or based on other parameters. A significant advantage of the use of a terrain maneuver advisory envelope as compared to a TAWS system alone, which is conventionally used, is that the flight crew is given information they need to make a decision about turns to avoid terrain without the system attempting to make a decision for the pilot. The problem with a system automatically deciding on a course of action to avoid terrain is that there might be difficulty in overcoming certification as well as a risk of system failure which may provide an erroneous course of action to a pilot.

While the detailed drawing, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communication bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A terrain advisory system for an aircraft, comprising:
a processing unit;
a display unit coupled to the processing unit, the display unit displaying a map;
a database coupled to the processing unit;
a sensor system coupled to the processing unit; and
a terrain awareness and warning system (TAWS) coupled to the processing unit, the TAWS generating cautions and alerts,
wherein the processing unit comprises a program that generates a terrain advisory envelope extending beyond the distance and lateral envelope within which the TAWS provides cautions and alerts, the terrain advisory envelope being distinguished from TAWS cautions and alerts with a graphical appearance that differs from the graphical appearance of TAWS cautions and alerts.

2. The terrain advisory system of claim 1, wherein the terrain advisory envelope comprises a color that is different than the color of a TAWS caution or a TAWS alert.

3. The terrain advisory system of claim 1, wherein the terrain advisory envelope comprises a fill pattern that is different than the fill pattern of a TAWS caution or a TAWS alert.

4. The terrain advisory system of claim 1, wherein the terrain advisory envelope terminates at a predetermined distance from the aircraft.

5. The terrain advisory system of claim 1, wherein the terrain advisory envelope terminates at a distance from the aircraft that is based on the speed of the aircraft.

6. The terrain advisory system of claim 1, wherein the terrain advisory envelope is displayed is automatically commanded to display the map, because of a TAWS caution or alert.

7. The terrain advisory system of claim 1, wherein the terrain advisory envelope is displayed in a 360 degree arc around the aircraft.

8. The terrain advisory system of claim 1, wherein the terrain advisory envelope is displayed in an arc that at most is 180 degrees.

9. A method of providing information to a flight crew member of an aircraft, comprising:
providing a display unit on board an aircraft;
generating a caution by a TAWS system;
displaying a map on the display, the displaying caused by the generation of a caution;
displaying a caution region on the map;
displaying a lateral boundary for the caution region;
generating a maneuver advisory region on the map, the maneuver advisory region being depicted with a different graphical representation than the caution region and the maneuver advisory region extending outside of the lateral boundary.

10. The method of claim 9, further comprising:
generating an outer boundary distance for the maneuver advisory region, based on a predetermined distance from the aircraft.

11. The method of claim 9, further comprising:
generating an outer boundary distance for the maneuver advisory region, based on the speed of the aircraft.

12. The method of claim 9, further comprising:
automatically commanding the display unit to display the map based on the TAWS caution becoming active.

13. The method of claim 9, further comprising:
generating a TAWS alert by the TAWS system; and
displaying an alert region on the map.

14. The method of claim 13, wherein the terrain advisory region comprises a color that is different than the color of the TAWS caution or the TAWS alert.

15. The method of claim 13, wherein the terrain advisory envelope comprises a fill pattern that is different than the color of the TAWS caution or the TAWS alert.

16. An apparatus for providing information to a flight crew member of an aircraft, comprising:
a means for displaying information to a flight crew member on board an aircraft;
a means for generating a caution by a TAWS system;
a means for generating a map on the display means, the generating caused by the generation of a caution;
a means for displaying a caution region on the map;
a means for displaying a lateral boundary for the caution region;
a means for generating a maneuver advisory region on the map, the maneuver advisory region being depicted with a different graphical representation than the caution region and the maneuver advisory region extending outside of the lateral boundary.

17. The apparatus of claim 16, further comprising:
a means for generating an outer boundary distance for the maneuver advisory region, based on a predetermined distance from the aircraft.

18. The apparatus of claim 16, further comprising:
a means for generating an outer boundary distance for the maneuver advisory region, based on the speed of the aircraft.

19. The apparatus of claim 16, further comprising:
a means for automatically commanding the display unit to display the map based on the TAWS caution becoming active.

20. The apparatus of claim 16, further comprising:
a means for generating a TAWS alert by the TAWS system; and
a means for displaying an alert region on the map.

21. The apparatus of claim 20, wherein the terrain advisory region comprises a color that is different than the color of the TAWS caution or the TAWS alert.

22. The apparatus of claim 20, wherein the terrain advisory envelope comprises a fill pattern that is different than the color of the TAWS caution or the TAWS alert.

* * * * *